(12) United States Patent
Baudot

(10) Patent No.: US 10,073,219 B2
(45) Date of Patent: Sep. 11, 2018

(54) INTEGRATED CIRCUIT INCLUDING AN ACTIVE DEVICE FOR CONFINEMENT OF A LIGHT FLUX DEFINED BY TRENCHES HAVING A TIERED SIDEWALL

(71) Applicant: STMicroelectronics (Crolles 2) SAS, Crolles (FR)

(72) Inventor: Charles Baudot, Lumbin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 11 days.

(21) Appl. No.: 15/051,904

(22) Filed: Feb. 24, 2016

(65) Prior Publication Data

US 2017/0059774 A1    Mar. 2, 2017

(30) Foreign Application Priority Data

Aug. 24, 2015 (FR) ...................................... 15 57883

(51) Int. Cl.
| | |
|---|---|
| G02B 6/12 | (2006.01) |
| H01L 21/763 | (2006.01) |
| G02B 6/122 | (2006.01) |
| G02F 1/025 | (2006.01) |

(52) U.S. Cl.
CPC ......... G02B 6/122 (2013.01); G02B 6/12004 (2013.01); G02F 1/025 (2013.01); *G02B 2006/121* (2013.01); *G02B 2006/12097* (2013.01)

(58) Field of Classification Search
CPC ............................. G02B 6/12; G02B 6/12004; G02B 2006/121; G02B 2006/12097; H01L 21/763; H01L 21/76232; H01L 21/823456

USPC ............ 385/14, 24, 147; 257/259, 329, 330; 438/587, 270, 589, 197
See application file for complete search history.

(56) References Cited

U.S. PATENT DOCUMENTS

| | | | |
|---|---|---|---|
| 5,757,986 A * | 5/1998 | Crampton | G02F 1/025 385/131 |
| 6,374,001 B1 * | 4/2002 | Bozeat | G02F 1/025 385/131 |
| 6,509,139 B1 * | 1/2003 | Roberts | G02B 6/13 385/131 |

(Continued)

FOREIGN PATENT DOCUMENTS

| | | |
|---|---|---|
| GB | 2355312 A | 4/2001 |
| WO | WO-2004008232 A1 | 1/2004 |

OTHER PUBLICATIONS

Hewitt et al, ( Imorived Modulation Performance of Silicon p-i-n Device by Trench Isolation) Journal of Lightwave Technology, vol. 19, No. 3, dated Mar. 2001.*

(Continued)

*Primary Examiner* — Akm Enayet Ullah
(74) *Attorney, Agent, or Firm* — Crowe & Dunlevy

(57) ABSTRACT

An integrated circuit includes an active device for confinement of a light flux that is formed in a semiconducting substrate. A confinement rib is separated from two doped zones by two trenches. Each doped zone includes a contacting zone on an upper face. Each trench widens from a bottom wall towards the upper face of the corresponding doped zone. The widening trenches present a sidewall having a tiered profile between the trench and the doped zone. An opposite sidewall presents a straight profile.

17 Claims, 4 Drawing Sheets

(56) References Cited

U.S. PATENT DOCUMENTS

| | | | | |
|---|---|---|---|---|
| 6,770,535 | B2* | 8/2004 | Yamada | H01L 21/763 257/329 |
| 6,936,839 | B2* | 8/2005 | Taylor | H01L 29/7785 257/184 |
| 7,528,403 | B1* | 5/2009 | Borselli | G02B 6/12004 257/101 |
| 7,555,173 | B2* | 6/2009 | Barrios | G02F 1/025 385/14 |
| 7,642,144 | B2* | 1/2010 | Marshall | H01L 21/76232 257/259 |
| 7,693,384 | B2* | 4/2010 | Lee | G02B 6/12007 385/129 |
| 8,049,274 | B2* | 11/2011 | Kim | H01L 21/823456 257/330 |
| 2006/0110091 | A1* | 5/2006 | Day | G02F 1/025 385/8 |
| 2010/0084504 | A1* | 4/2010 | Eggen | B65H 49/22 242/598.3 |
| 2010/0266233 | A1* | 10/2010 | Morris | G01C 19/721 385/2 |
| 2011/0007761 | A1* | 1/2011 | Assefa | G02F 1/025 372/34 |
| 2011/0255823 | A1* | 10/2011 | Li | G02B 6/12002 385/14 |
| 2012/0243828 | A1* | 9/2012 | Suzuki | G02B 6/12007 385/32 |
| 2014/0116983 | A1* | 5/2014 | Kitamura | G02F 1/025 216/13 |
| 2015/0093067 | A1* | 4/2015 | Manouvrier | G02F 1/025 385/3 |

OTHER PUBLICATIONS

INPI Search Report and Written Opinion for FR 1557883 dated May 13, 2016 (8 pages).

Tan, Shaoyang et al: "High Power 1060nm Super Large Vertical Cavity Semiconductor Lasers," Optomechatronic Micro/Nano Devices and Components III, Oct. 8-10, 2007, Proceedings of SPIE, vol. 9266, Nov. 17, 2014—pp. 92660O-192660O6.

Sacher, Wesley D et al: "Multilayer Silicon Nitride-On-Silicon Integrated Photonic Platforms and Devices," Journal of Lightwave Technology Service Center, New York, vol. 33, No. 4, Feb. 15, 2015, pp. 901-910.

* cited by examiner

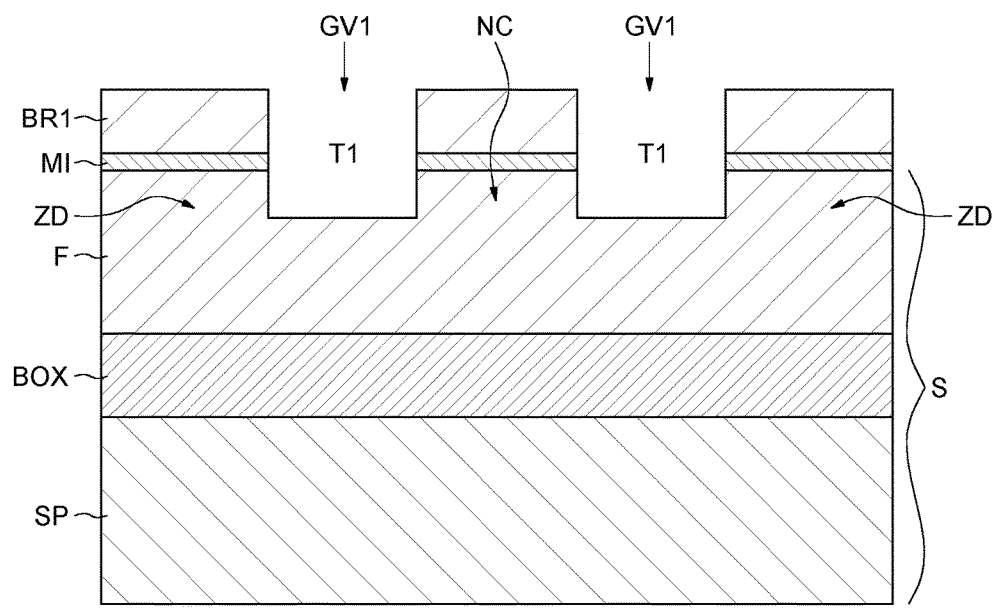
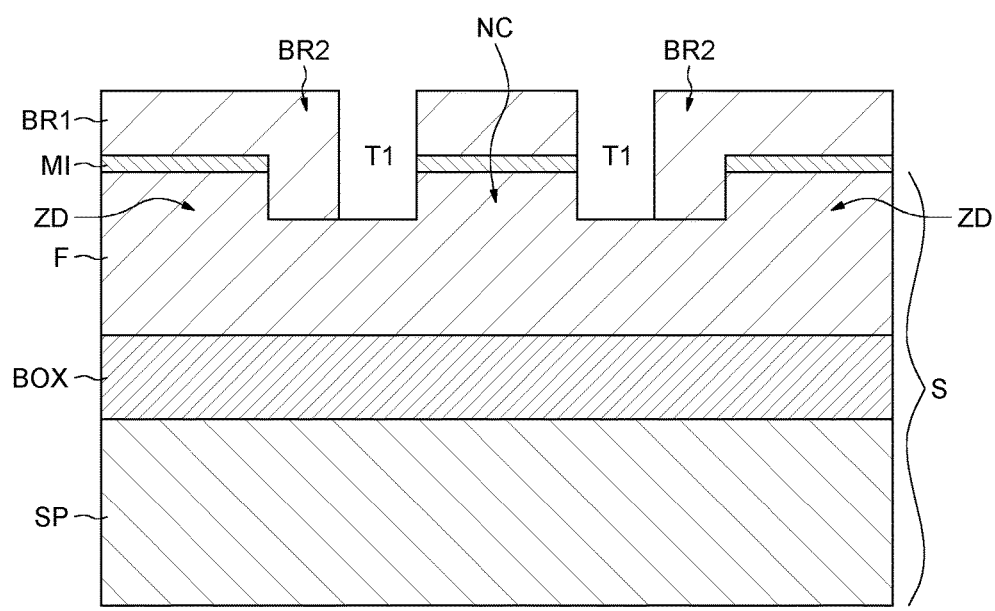

000# INTEGRATED CIRCUIT INCLUDING AN ACTIVE DEVICE FOR CONFINEMENT OF A LIGHT FLUX DEFINED BY TRENCHES HAVING A TIERED SIDEWALL

PRIORITY CLAIM

This application claims priority from French Application for Patent No. 1557883 filed Aug. 24, 2015, the disclosure of which is incorporated by reference.

TECHNICAL FIELD

Methods of implementation and embodiments of the invention relate to integrated circuits and, more particularly, to integrated active devices for confinement of a light flux such as a laser beam. Non-limiting examples of active confinement devices include waveguides, for example incorporated within optical modulators or indeed ring-type resonators.

BACKGROUND

At present, active devices for confinement of a light flux often include confinement-rib structures.

For example, ring-type active resonators including a confinement-rib structure are widely used in various on-silicon integrated photonic platforms.

A confinement-rib structure generally includes a confinement rib separated from two doped zones by two trenches realized in a semiconducting film of a semiconducting substrate having a high refractive index.

The two trenches generally possess a uniform depth depending on the configurations and architectures of the other devices that are present in the integrated circuit. The walls of the confinement rib determine the horizontal confinement of the mode of propagation of the light flux, whereas the interfaces of the semiconducting film (that is to say, the interface of the upper face of this rib and the interface of the lower face of the slab) with upper and lower layers determine the vertical confinement of the mode of propagation.

Despite working well for grating couplers, active rib structures with shallow trenches generally suffer from low efficiency because of poor horizontal confinement. Consequently, very long devices are necessary to modulate the light flux correctly. This results in optical losses, because of the dispersion of the energy of the light flux along the path travelled.

In addition, the light flux cannot be bent easily, and a radius of curvature greater than 40 µm is generally necessary.

Rib structures with deep trenches exhibit, in contrast, a good optical confinement; and a radius of curvature of the order of 5 µm may be used without excessive optical losses.

However, the semiconducting slab is observed to have a higher electrical resistance in comparison with a configuration having shallow trenches even if the semiconducting film is strongly doped, thereby leading to a high electrical access resistance to the active rib structure.

Furthermore, if the opening of the trenches—that is to say, the distance between the confinement rib and one of the two doped zones—is reduced, there will be parasitic effects in the interconnect (BEOL: Back End Of Line) part of the integrated circuit, also resulting in significant losses.

In practice, a ring-type modulator that is compatible with the IEEE Datacom standard necessitates a relatively small ring radius in order to obtain a small footprint on silicon. This requires a good confinement in the waveguide, in order to avoid lateral losses in the bends. Since ring-type modulators must, in addition, be addressed electrically, use has to be made of waveguides of the rib type, because a strip-type structure is not suitable.

Furthermore, the dual condition of low losses and small radius of curvature compels the use of deep trenches.

However, the semiconducting slab has to be as thick as possible, so as to reduce access resistance.

Therefore this results in a contradiction.

SUMMARY

So, according to one embodiment it is proposed to form a confinement-rib structure enabling, advantageously, a good optical confinement and a low access resistance to be ensured, thereby making it compatible, in particular, with ring-type modulators conforming to the IEEE Datacom standard.

According to one aspect, an integrated circuit is proposed including, in a semiconducting substrate, an active device for confinement of a light flux, including a confinement rib separated from two doped zones by two trenches, each doped zone including a contacting zone on an upper face of this doped zone.

According to one general characteristic of this aspect, each trench widens from its bottom wall towards the upper face of the corresponding doped zone.

According to one embodiment, this widening may be obtained by virtue of the fact that the wall of each trench situated on the side of the corresponding doped zone has a tiered profile.

Advantageously, the tiered profile may define with the wall situated on the side of the confinement rib at least one first trench part and one second trench part, the first trench part being deeper and narrower than the second trench part.

Of course, a larger number of trench parts could be envisaged.

According to one embodiment, the opening of the first trench part is smaller than 400 nm, and the total opening (opening of the second trench part, for example) of each trench is larger than 1.5 µm.

The parts of the semiconducting substrate respectively subjacent to said first and second trench parts possess, for example, respectively, a first thickness of the order of 50 nm to 70 nm and a second thickness of the order of 120 nm to 180 nm.

The semiconducting substrate may advantageously be a semiconducting film of a substrate of silicon-on-insulator (SOI) type.

BRIEF DESCRIPTION OF THE DRAWINGS

Other advantages and features of the invention will become apparent upon study of the detailed description of embodiments which are given by way of non-limiting examples and illustrated by the appended drawings, in which:

FIGS. 2 to 7 illustrate schematically various steps of an example of a process for producing an integrated circuit.

DETAILED DESCRIPTION

Figure 1:
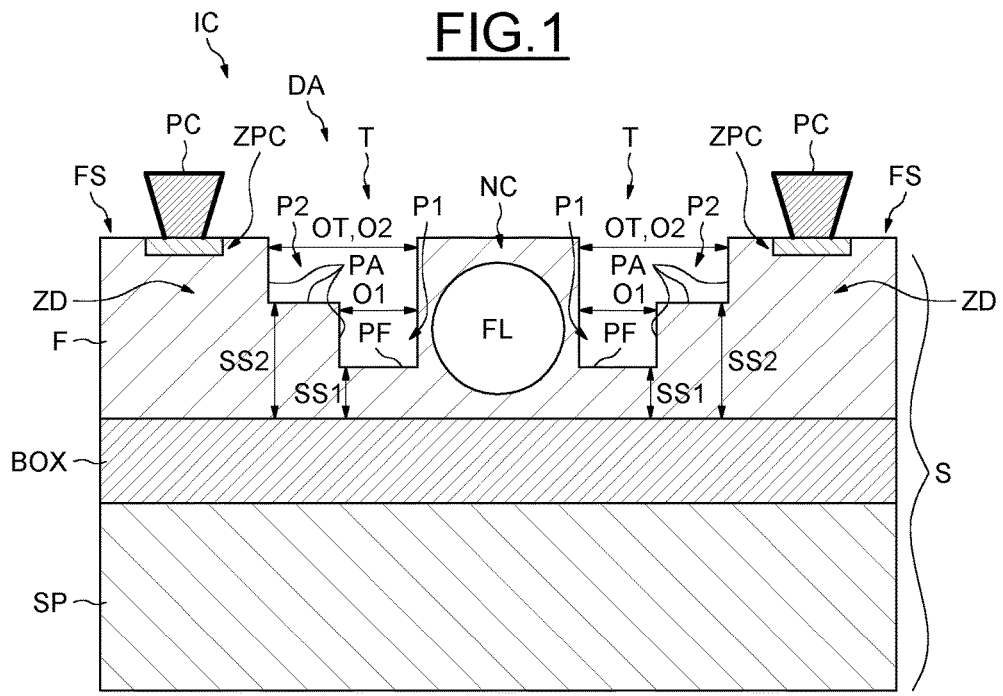
FIG. 1 illustrates schematically one embodiment of an integrated circuit.

In FIG. 1, which is a schematic cross section, the reference IC indicates an integrated circuit including an active device DA for confinement of a light flux, for example a ring-type resonator disposed in a substrate which is formed here from a semiconducting film F.

The substrate is a substrate S of silicon-on-insulator (SOI) type including the semiconducting film F, for example made of silicon, situated above a buried insulating layer BOX, commonly designated by the acronym BOX (Buried OXide), itself situated above a carrier substrate SP, for example a semiconducting well, which enables the rigidity of the integrated circuit IC to be ensured, considering the small thicknesses of the semiconducting film F and of the buried insulating layer BOX. The semiconducting film F has, for example, a thickness of 300 nm.

The active device DA includes a confinement rib NC separated from two doped zones ZD by two trenches T.

Each trench widens from its bottom wall PF towards an upper face FS of the corresponding doped zone ZD.

In this embodiment, the widening is obtained by a tiered profile of the wall PA of each trench T situated on the side of the corresponding doped zone ZD.

Such a tiered profile makes it possible to have at least one first trench part P1 and one second trench part P2. The first trench part P1 is situated alongside the confinement rib NC and is deeper than the second trench part P2.

Such a deep first trench part P1 advantageously makes it possible to ensure a good optical confinement for light flux FL in the confinement rib NC and a small radius of curvature, for example of the order of 5 µm. The opening O1 of the first trench part P1 is advantageously smaller than 400 nm, for example of the order of 300 nm. The semiconducting slab SS1 subjacent to the first trench part P1 has a relatively small thickness, for example of the order of 50 nm to 70 nm.

The second trench part P2 situated above the first part P1 has a smaller depth than that of the first part P1, and the semiconducting slab SS2 subjacent to the second part P2 is therefore relatively thicker; it for example has a thickness equal to one half of the thickness of the semiconducting film F to within 20%—that is to say, in the example of a semiconducting film F of 300 nm, a thickness of the order of 120 nm to 180 nm.

Such a structure of the second part P2 advantageously enables the access resistance of the active device DA to be reduced while ensuring the good optical confinement of the confinement rib NC. The total opening OT of each trench—that is to say, here, the opening O2 of the second part P2—is, for example, larger than 1.5 µm, in order to prevent mode interactions.

Although a tiered profile having only a single tier has been described above, if necessary a plurality of tiers, associated with trench parts having depths that gradually get smaller in the direction of the corresponding doped zone ZD, could also be provided.

Each doped zone ZD includes, in addition, a contacting zone on the upper face FS of this doped zone ZD, for example a silicided zone ZPC, for receiving a contact PC.

Reference will now be made to FIGS. 2 to 6 to illustrate an example of a process for producing an integrated circuit IC according to the invention.

Figure 2:
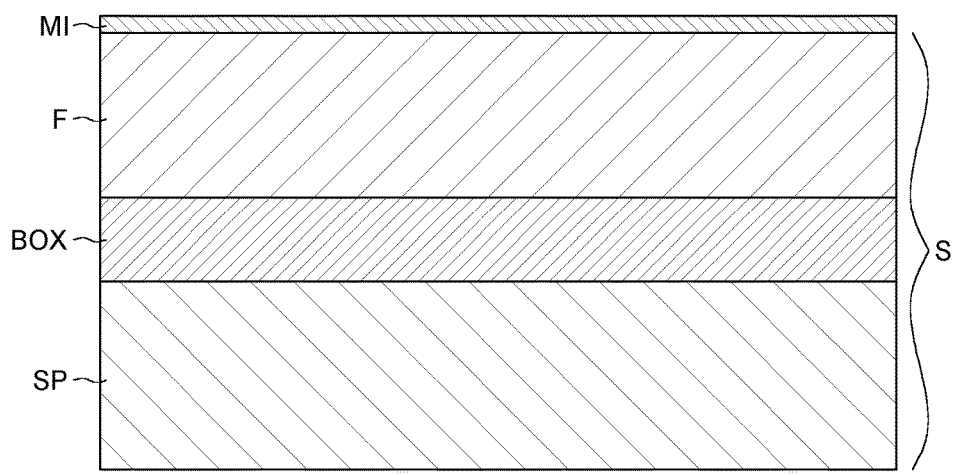
Figure 5:
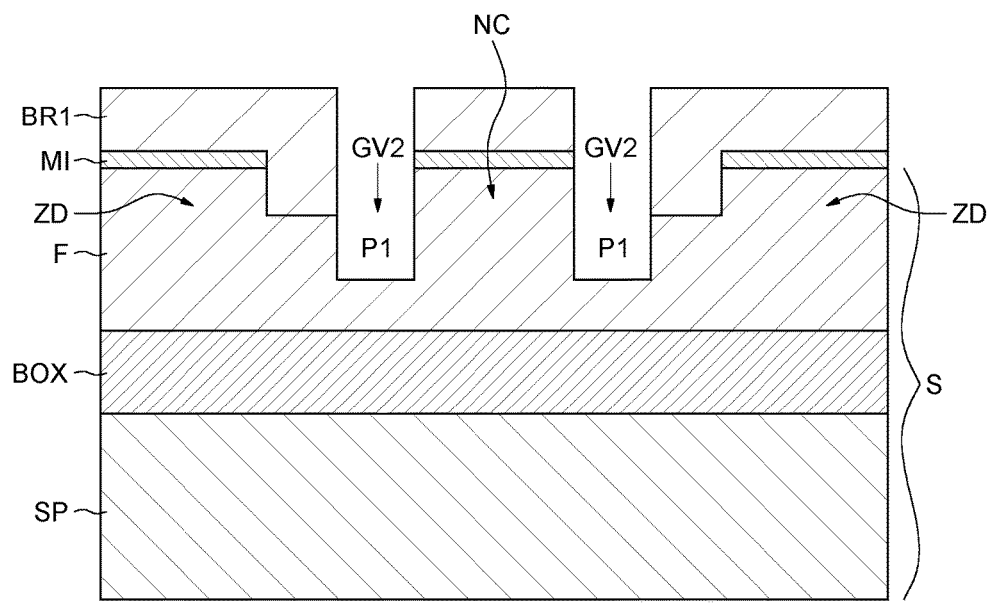
Figure 6:
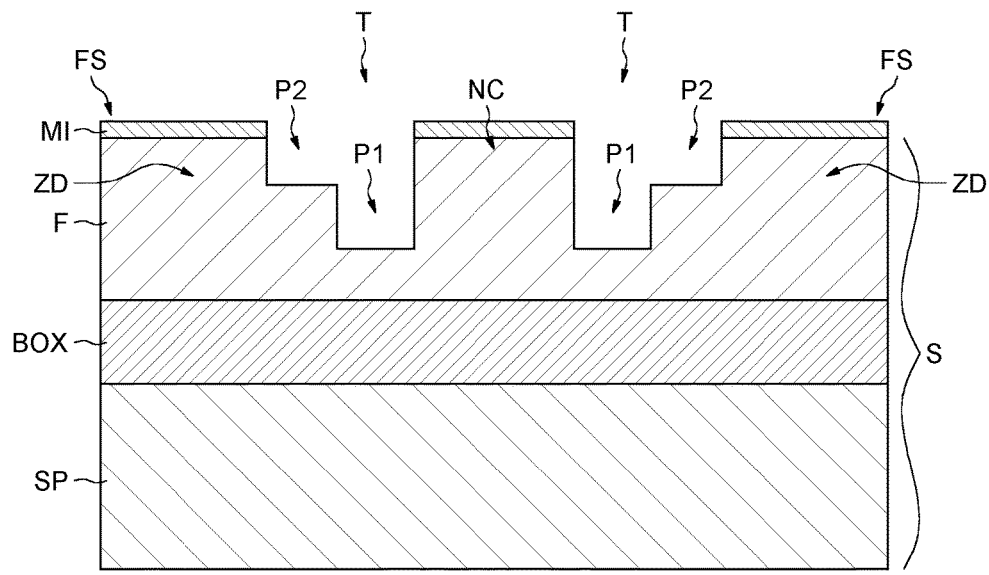

FIG. 2 shows a substrate S of silicon-on-insulator (SOI) type, which is provided for a realization of the integrated circuit IC.

The substrate S of SOI type includes the semiconducting film F situated on the buried insulating layer BOX, itself situated above the carrier substrate SP.

First of all, a hard mask MI is deposited on the semiconducting film F using a customary process from the field of semiconductors, such as PVD (Physical Vapor Deposition), CVD (Chemical Vapor Deposition), or of atomic layer deposition (ALD). The hard mask MI may be a layer of insulating material, for example of silicon nitride.

For the realization of the trenches T, the zones provided for the confinement rib NC and the doped zones ZD are protected by first resist blocks BR1 formed conventionally by photolithography.

After this, a first anisotropic etch GV1 of the layer of insulating material MI and of the semiconducting film F is carried out (FIG. 3), so as to form initial trenches T1 separating the confinement rib NC and the doped zones ZD. This selective anisotropic etch may be a dry etch of the reactive-ion-etching (RIE) type well known to those skilled in the art.

Next, second resist blocks BR2 partly filling the trenches T1 are formed by photolithography, in order to protect the trench parts situated alongside the doped zones ZD, as illustrated in FIG. 4.

A second anisotropic etch GV2 of the semiconducting film F is carried out anew (FIG. 5), so as to obtain the first trench parts P1.

After this, the first and second resist blocks BR1 and BR2 are removed (FIG. 6), so as to form the second trench parts P2.

It should be noted that the first trench part P1 is deeper and narrower than the second trench part P2.

Because of this, the walls PA of the trenches situated on the side of the doped zones ZD possess tiered profiles, and each trench T widens from its bottom wall PF towards an upper face FS of the corresponding doped zone ZD.

Figure 7:
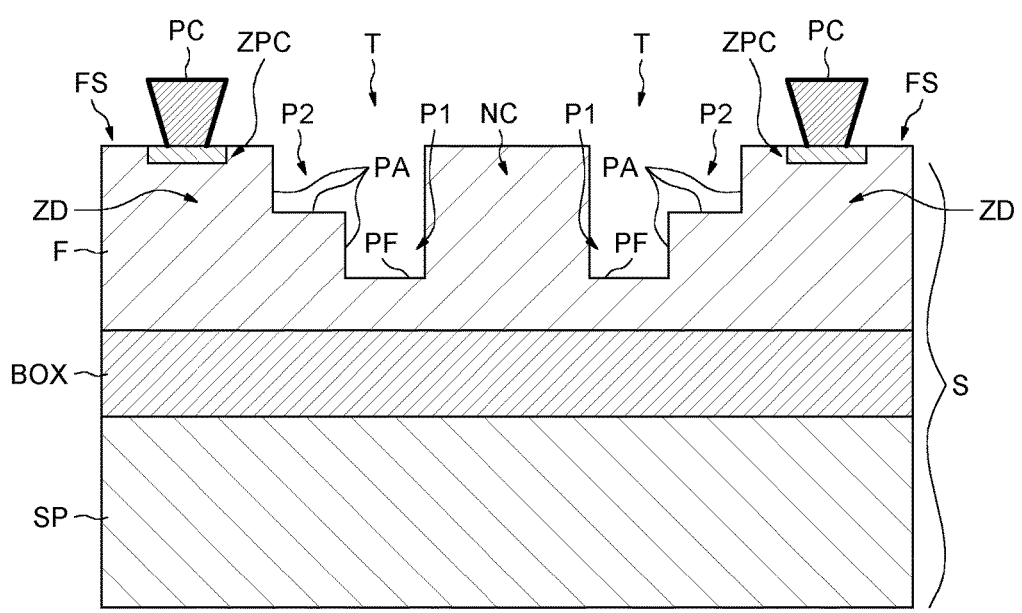

Next, the layer of insulating material MI is removed (FIG. 7), and the doped zones ZD are formed by implanting appropriate dopants. Lastly, contacting zones ZPC are realized on the upper faces FS of the doped zones ZD for the contacts PC, as illustrated in FIG. 7.

In this way, an integrated circuit IC is obtained including an active device DA for confinement of a light flux, the widened (for example, tiered) profile of each trench of which enables a good optical confinement and a low active device DA access resistance to be obtained.

The invention claimed is:

1. An integrated circuit, comprising:
   a semiconducting substrate including an active device for confinement of a light flux including a confinement rib separated from two doped zones by two trenches that are formed in the semiconducting substrate, each doped zone including a contacting zone on an upper face of the doped zone,
   wherein each trench of said two trenches formed in the semiconducting substrate widens from a bottom wall towards the upper face of the corresponding doped zone.

2. The integrated circuit according to claim 1, wherein a sidewall of each trench situated on a side of the corresponding doped zone has a tiered profile.

3. The integrated circuit according to claim 2, wherein the tiered profile defines with a further sidewall situated on the side of the confinement rib at least one first trench part and one second trench part, the first trench part being deeper and narrower than the second trench part.

4. The integrated circuit according to claim 3, wherein an opening of the first trench part is smaller than 400 nm, and a total opening of each trench is larger than 1.5 µm.

5. The integrated circuit according to claim 3, wherein first and second semiconducting substrate parts respectively subjacent to said first and second trench parts possess, respectively, a first thickness of the order of 50 nm to 70 nm and a second thickness of the order of 120 nm to 180 nm.

6. The integrated circuit according to claim 1, wherein the semiconducting substrate is a semiconducting film of a substrate of silicon-on-insulator type.

7. An integrated circuit, comprising:
a semiconducting film having a top surface;
a first trench formed in the semiconducting film from the top surface, said first trench separating a confinement rib from a first doped zone;
wherein said first trench formed in the semiconducting substrate has a depth less than a thickness of the semiconducting film;
wherein said first trench formed in the semiconducting substrate is defined by a first sidewall adjacent the confinement rib and a second sidewall adjacent the first doped zone, said first substrate sidewall having a straight profile and said second substrate sidewall having a tiered profile.

8. The integrated circuit of claim 7, wherein the first substrate sidewall and a first portion of the second substrate sidewall define a first trench part, and wherein the first substrate sidewall and a second portion of the second substrate sidewall define a second trench part, said second trench part being wider than the first trench part in a direction extending between the confinement rib and the first doped zone.

9. The integrated circuit of claim 7, wherein the semiconducting film is a part of a silicon-on-insulator type substrate.

10. The integrated circuit of claim 7, further comprising:
a second trench formed in the semiconducting film from the top surface, said second trench separating the confinement rib from a second doped zone;
wherein said second trench formed in the semiconducting substrate has a depth less than the thickness of the semiconducting film;
wherein said second trench formed in the semiconducting substrate is defined by a third substrate sidewall adjacent the confinement rib and a fourth substrate sidewall adjacent the second doped zone, said third substrate sidewall having a straight profile and said fourth substrate sidewall having a tiered profile.

11. The integrated circuit of claim 10, wherein the third substrate sidewall and a first portion of the fourth substrate sidewall define a third trench part, and wherein the third substrate sidewall and a second portion of the fourth substrate sidewall define a fourth trench part, said fourth trench part being wider than the third trench part in a direction extending between the confinement rib and the second doped zone.

12. The integrated circuit of claim 7, wherein the confinement rib functions to contain light flux.

13. An integrated circuit, comprising:
a semiconducting film having a top surface;
a first trench formed in the semiconducting film from the top surface, said first trench separating a confinement rib from a first doped zone;
wherein said first trench formed in the semiconducting substrate has a depth less than a thickness of the semiconducting film;
wherein said first trench formed in the semiconducting substrate is defined by a first substrate sidewall adjacent the confinement rib and a second substrate sidewall adjacent the first doped zone, said first trench formed in the semiconducting substrate widening, in a direction extending between the confinement rib and the first doped zone, from a narrowest width at a bottom wall of the first trench to a broadest width at the top surface.

14. The integrated circuit of claim 13, wherein the widening has a tiered profile on a least one substrate sidewall of the trench.

15. The integrated circuit of claim 14, wherein the at least one substrate sidewall with the tiered profile is positioned between the trench and the first doped zone.

16. The integrated circuit of claim 15, wherein a substrate sidewall of the trench opposite the substrate sidewall with the tiered profile has a straight profile.

17. The integrated circuit of claim 16, wherein the tiered profile defines a plurality of trench parts of different size in said trench.

* * * * *